United States Patent
Zhao et al.

(10) Patent No.: US 10,091,744 B2
(45) Date of Patent: Oct. 2, 2018

(54) UNLICENSED CARRIER POWER CONTROL METHOD, DEVICE, AND STORAGE MEDIUM

(71) Applicant: ZTE Corporation, Shenzhen (CN)

(72) Inventors: Yajun Zhao, Shenzhen (CN); Hanqing Xu, Shenzhen (CN); Linmei Mo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/548,651

(22) PCT Filed: Oct. 8, 2015

(86) PCT No.: PCT/CN2015/091488
§ 371 (c)(1),
(2) Date: Aug. 3, 2017

(87) PCT Pub. No.: WO2016/123999
PCT Pub. Date: Aug. 11, 2016

(65) Prior Publication Data
US 2018/0007644 A1    Jan. 4, 2018

(30) Foreign Application Priority Data
Feb. 4, 2015    (CN) .......................... 2015 1 0063291

(51) Int. Cl.
*H04B 7/00* (2006.01)
*H04W 52/36* (2009.01)
*H04W 52/06* (2009.01)
*H04W 16/14* (2009.01)

(52) U.S. Cl.
CPC ......... *H04W 52/367* (2013.01); *H04W 16/14* (2013.01); *H04W 52/06* (2013.01)

(58) Field of Classification Search
None
See application file for complete search history.

(56) References Cited

U.S. PATENT DOCUMENTS

| | | | |
|---|---|---|---|
| 2009/0286496 A1* | 11/2009 | Yavuz | H04W 52/241 455/127.1 |
| 2009/0298522 A1 | 12/2009 | Chaudhri et al. | |
| 2013/0343288 A1 | 12/2013 | Ratasuk et al. | |

(Continued)

FOREIGN PATENT DOCUMENTS

| | | |
|---|---|---|
| CN | 102027786 A | 4/2011 |
| CN | 103444238 A | 12/2013 |

OTHER PUBLICATIONS

International Search Report for corresponding application PCT/CN2015/091488 filed on Oct. 8, 2015; dated Jan. 20, 2016.

(Continued)

*Primary Examiner* — Mohammed Rachedine
(74) *Attorney, Agent, or Firm* — Cantor Colburn LLP (57) ABSTRACT

An unlicensed carrier power control method is provided. Multiple transmitted power constraint parameters are acquired, and a minimum value in the multiple transmitted power constraint parameters is determined. Power control is performed according to the minimum value in the multiple transmitted power constraint parameters. An unlicensed carrier power control device and a storage medium are also provided.

12 Claims, 1 Drawing Sheet

---

UE acquires multiple transmitted power constraint parameters, and determines a minimum value in the multiple transmitted power constraint parameters — 101

The UE performs power control according to the minimum value in the multiple transmitted power constraint parameters — 102

(56) References Cited

U.S. PATENT DOCUMENTS

2014/0071933 A1\* 3/2014 Lee ................... H04W 52/367
 370/329
2014/0094213 A1 4/2014 Khoshnevis et al.
2014/0241301 A1\* 8/2014 Nakashima ......... H04W 52/365
 370/329

OTHER PUBLICATIONS

Extended European Search Report dated Nov. 22, 2017 re: Application No. 15880941.8-1875/3255935 PCT/CN2015/091488; pp. 1-8; citing: US 2014/094213 A1, US 2013/343288 A and US 2009/298522 A.

\* cited by examiner

UNLICENSED CARRIER POWER CONTROL METHOD, DEVICE, AND STORAGE MEDIUM

TECHNICAL FIELD

The disclosure relates to a related technology of unlicensed carrier power control in the field of mobile communications, and particularly to an unlicensed carrier power control method and device, and a storage medium.

BACKGROUND

For a communication system using an unlicensed carrier, it may be suggested to avoid use of an unlicensed carrier which is being used by an existing station, otherwise mutual interference of systems may be introduced. Therefore, in some countries, such as Europe and Japan, a Listen Before Talk (LBT) function is compulsively required to be supported for an unlicensed carrier. That is, before a certain unlicensed carrier is used, a Clear Channel Assessment (CCA) technology is executed. If it is found that certain equipment is using the unlicensed carrier or detected signal energy exceeds a CCA threshold, access is delayed; and if it is found that a channel is idle or the detected signal energy is lower than the CCA threshold, the unlicensed carrier can be occupied.

A power control method in a related technology is only set from the point of a single cell, and does not consider a carrier sharing requirement of an unlicensed carrier scenario. Therefore, it is needed to provide an unlicensed carrier power control solution capable of increasing using opportunities of an unlicensed carrier under the condition of considering the carrier sharing requirement of the unlicensed carrier scenario.

SUMMARY

Some embodiments of the disclosure provide an unlicensed carrier power control method and device, and a storage medium, which may improve using opportunities of an unlicensed carrier.

The technical solutions of the embodiments of the disclosure are implemented as follows.

An embodiment of the disclosure provides an unlicensed carrier power control method, which may include the following acts.

Multiple transmitted power constraint parameters are acquired, and a minimum value in the multiple transmitted power constraint parameters is determined.

Power control is performed according to the minimum value in the multiple transmitted power constraint parameters.

In the embodiment, in a scenario of open loop power control, the multiple transmitted power constraint parameters may include:

maximum transmitted power considering an unlicensed carrier spectrum threshold, maximum transmitted power not considering the unlicensed carrier spectrum threshold and initial transmitted power not considering the unlicensed carrier spectrum threshold;

or, maximum transmitted power considering an unlicensed carrier spectrum threshold of a neighbor frequency point of an unlicensed carrier spectrum, maximum transmitted power considering the unlicensed carrier spectrum threshold, maximum transmitted power not considering the unlicensed carrier spectrum threshold and initial transmitted power not considering the unlicensed carrier spectrum threshold;

or, maximum transmitted power considering a primary system threshold on an unlicensed carrier spectrum, maximum transmitted power considering the unlicensed carrier spectrum threshold, maximum transmitted power not considering the unlicensed carrier spectrum threshold and initial transmitted power not considering the unlicensed carrier spectrum threshold;

or, maximum transmitted power not considering the unlicensed carrier spectrum threshold and transmitted power of a reference data channel.

In the embodiment, in a scenario of open loop power control, when the multiple transmitted power constraint parameters include transmitted power of a reference data channel and maximum transmitted power not considering an unlicensed carrier spectrum threshold, User Equipment (UE) may obtain $P_{UN1}$ according to $P_{UN1}=P_{init\_pc}+\beta(E_{th}-E_0)$, where $P_{UN1}$ is the transmitted power of the reference data channel in the scenario of open loop power control, $\beta$ is a weighting coefficient, $E_{th}$ is a preset unlicensed carrier availability judgment energy strength threshold value, $E_0$ is signal strength, measured at an unlicensed carrier, of a neighbor node, and $P_{init\_pc}$ is initial transmitted power not considering the unlicensed carrier spectrum threshold.

In the embodiment, in a scenario of open loop power control, when the multiple transmitted power constraint parameters include transmitted power of a reference data channel and maximum transmitted power not considering an unlicensed carrier spectrum threshold, a base station may obtain $P_{UN1\_BS}$ according to $P_{UN1\_BS}=P_{init\_BS}+\beta(E_{th}-E_0)$, where $P_{UN1\_BS}$ is the transmitted power of the reference data channel in the scenario of open loop power control, $\beta$ is a weighting coefficient, $E_{th}$ is a preset unlicensed carrier availability judgment energy strength threshold value, $E_0$ is signal strength, measured at an unlicensed carrier, of a neighbor node, and $P_{init\_BS}$ is initial transmitted power not considering the unlicensed carrier spectrum threshold.

In the embodiment, in a scenario of closed loop power control, the multiple transmitted power constraint parameters may include:

maximum transmitted power considering the unlicensed carrier spectrum threshold, maximum transmitted power not considering the unlicensed carrier spectrum threshold and actual transmitted power not considering the unlicensed carrier spectrum threshold;

or, maximum transmitted power considering an unlicensed carrier spectrum threshold of a neighbor frequency point of an unlicensed carrier spectrum, maximum transmitted power considering the unlicensed carrier spectrum threshold, maximum transmitted power not considering the unlicensed carrier spectrum threshold and actual transmitted power not considering the unlicensed carrier spectrum threshold;

or, maximum transmitted power considering a primary system threshold on an unlicensed carrier spectrum, maximum transmitted power considering the unlicensed carrier spectrum threshold, maximum transmitted power not considering the unlicensed carrier spectrum threshold and actual transmitted power not considering the unlicensed carrier spectrum threshold;

or, transmitted power of a reference data channel and maximum transmitted power not considering the unlicensed carrier spectrum threshold.

In the embodiment, in a scenario of closed loop power control, when the multiple transmitted power constraint parameters include transmitted power of a reference data channel and maximum transmitted power not considering an unlicensed carrier spectrum threshold, the UE may obtain $P_{UN2}$ according to $P_{UN2}=P_{pc}+\beta(E_{th}-E_0)$, where $P_{UN2}$ is the transmitted power of the reference data channel in the scenario of closed loop power control, $\beta$ is a weighting coefficient, $E_{th}$ is a preset unlicensed carrier availability judgment energy strength threshold value, $P_{pc}$ is the actual transmitted power not considering the unlicensed carrier spectrum threshold, and $E_0$ is signal strength, measured at an unlicensed carrier, of a neighbor node.

In the embodiment, in a scenario of closed loop power control, when the multiple transmitted power constraint parameters include transmitted power of a reference data channel and maximum transmitted power not considering an unlicensed carrier spectrum threshold, the base station may obtain $P_{UN2\_BS}$ according to $P_{UN2\_BS}=P_{pc\_BS}+\beta(E_{th}-E_0)$, where $P_{UN2\_BS}$ is the transmitted power of the reference data channel in the scenario of closed loop power control, $\beta$ is a weighting coefficient, $E_{th}$ is a preset unlicensed carrier availability judgment energy strength threshold value, $P_{pc\_BS}$ is actual transmitted power not considering the unlicensed carrier spectrum threshold, and $E_0$ is signal strength, measured at an unlicensed carrier, of a neighbor node.

In the embodiment, the act that power control is performed according to the minimum value in the multiple transmitted power constraint parameters may include that: current transmitted power is set to be a difference value between the minimum value and a preset power offset according to the minimum value in the multiple transmitted power constraint parameters.

In the embodiment, for a small-bandwidth channel or signal, the act that power control is performed according to the minimum value in the multiple transmitted power constraint parameters may include the following acts.

Transmitted power of the small-bandwidth channel or signal is set to be $P_2=P_{min}-10\lg(W_i/W_0)-\Delta P'$, where $P_{min}$ is the minimum value in the multiple transmitted power constraint parameters, $W_i$ is a bandwidth of the small-bandwidth channel or a channel bandwidth occupied by the small-bandwidth signal, $W_0$ is a bandwidth of a reference data channel, and $\Delta P'$ is a preset power regulation offset.

The act of executing power control according to the minimum value in the multiple transmitted power constraint parameters is performed by UE.

In the embodiment, for a small-bandwidth channel or signal, the act that power control is performed according to the minimum value in the multiple transmitted power constraint parameters may include the following acts.

Transmitted power of the small-bandwidth channel or signal is set to be $P'_2=P'_{min}-10\lg(W_i/W_0)-\Delta P'$, where $P'_{min}$ is the minimum value in the multiple transmitted power constraint parameters, $W_i$ is a bandwidth of the small-bandwidth channel or a channel bandwidth occupied by the small-bandwidth signal, $W_0$ is a bandwidth of a reference data channel, and $\Delta P'$ is a preset power regulation offset.

The act of executing power control according to the minimum value in the multiple transmitted power constraint parameters is performed by a base station.

In the embodiment, for a reservation signal, the act that power control is performed according to the minimum value in the multiple transmitted power constraint parameters may include the following act.

Transmitted power of the reservation signal is set to be a sum of a preset power increment and a difference value between the minimum value and a preset power offset.

In the embodiment, the method may further include that: a UE reports Power Headroom Report (PHR) to a base station, $PHR=P'_{max}-p_{UE}$, where $P'_{max}$ is maximum transmitted power considering an unlicensed carrier spectrum threshold, and $P_{UE}$ is current transmitted power of the UE.

In the embodiment, the method may further include the following acts. Corresponding unlicensed carrier availability judgment energy strength threshold values adopted when multiple signals or channels of different frequency-domain sparsity occupy an unlicensed carrier are acquired. Frequency-domain sparse signals or channels which are able to be borne by the unlicensed carrier are determined according to signal strength of a neighbor node and the corresponding unlicensed carrier availability judgment energy strength threshold values adopted when multiple signals or channels of different frequency-domain sparsity occupy the unlicensed carrier.

Another embodiment of the disclosure further provides an unlicensed carrier power control device, which may include: an acquisition module and a control module.

The acquisition module may be configured to acquire multiple transmitted power constraint parameters, and determine a minimum value in the multiple transmitted power constraint parameters.

The control module may be configured to perform power control according to the minimum value in the multiple transmitted power constraint parameters.

In the embodiment, in a scenario of open loop power control, when the multiple transmitted power constraint parameters include transmitted power of a reference data channel and maximum transmitted power not considering an unlicensed carrier spectrum threshold, the acquisition module may be configured to obtain $P_{UN1}$ according to $P_{UN1}=P_{init\_pc}+\beta(E_{th}-E_0)$, where $P_{UN1}$ is the transmitted power of the reference data channel in the scenario of open loop power control, $\beta$ is a weighting coefficient, $E_{th}$ is a preset unlicensed carrier availability judgment energy strength threshold value, $E_0$ is signal strength, measured at an unlicensed carrier, of a neighbor node, and $P_{init\_pc}$ is initial transmitted power not considering the unlicensed carrier spectrum threshold.

The acquisition module may be located on a UE.

In the embodiment, in a scenario of closed loop power control, when the multiple transmitted power constraint parameters include transmitted power of a reference data channel and maximum transmitted power $P_{max}$ not considering an unlicensed carrier spectrum threshold, the acquisition module is configured to obtain $P_{UN2}$ according to $P_{UN2}=P_{pc}+\beta(E_{th}-E_0)$, where $P_{UN2}$ is the transmitted power of the reference data channel in the scenario of closed loop power control, $\beta$ is a weighting coefficient, $E_{th}$ is a preset unlicensed carrier availability judgment energy strength threshold value, $P_{pc}$ is actual transmitted power not considering the unlicensed carrier spectrum threshold, and $E_0$ is signal strength, measured at an unlicensed carrier, of a neighbor node.

The acquisition module may be located on a UE.

In the embodiment, in a scenario of open loop power control, when the multiple transmitted power constraint parameters include transmitted power of a reference data channel and maximum transmitted power not considering an unlicensed carrier spectrum threshold, the acquisition module may be configured to obtain $P_{UN1\_BS}$ according to $P_{UN1\_BS}=P_{init\_BS}+\beta(E_{th}-E_0)$, where $P_{UN1\_BS}$ is the transmitted power of the reference data channel in the scenario of open loop power control, $\beta$ is a weighting coefficient, $E_{th}$ is a preset unlicensed carrier availability judgment energy strength threshold value, $E_0$ is signal strength, measured at an unlicensed carrier, of a neighbor node, and $P_{init\_BS}$ is initial transmitted power not considering the unlicensed carrier spectrum threshold.

The acquisition module may be located on a base station.

In the embodiment, in a scenario of closed loop power control, when the multiple transmitted power constraint parameters include transmitted power of a reference data channel and maximum transmitted power not considering an unlicensed carrier spectrum threshold, the acquisition module may be configured to obtain $P_{UN2\_BS}$ according to $P_{UN2\_BS}=P_{pc\_BS}+\beta(E_{th}-E_0)$, where $P_{UN2\_BS}$ is the transmitted power of the reference data channel in the scenario of closed loop power control, $\beta$ is a weighting coefficient, $E_{th}$ is a preset unlicensed carrier availability judgment energy strength threshold value, $P_{pc\_BS}$ is actual transmitted power not considering the unlicensed carrier spectrum threshold, and $E_0$ is signal strength, measured at an unlicensed carrier, of a neighbor node.

The acquisition module may be located on a base station.

In the embodiment, the control module may be configured to set current transmitted power to be a difference value between the minimum value and a preset power offset according to the minimum value in the multiple transmitted power constraint parameters.

In the embodiment, for a small-bandwidth channel or signal, the control module may be configured to set transmitted power of the small-bandwidth channel or signal to be $P_2=P_{min}-10 \lg(W_i/W_0)-\Delta P'$, where $P_{min}$ is the minimum value in the multiple transmitted power constraint parameters, $W_i$ is a bandwidth of the small-bandwidth channel or a channel bandwidth occupied by the small-bandwidth signal, $W_0$ is a bandwidth of a reference data channel, and $\Delta P'$ is a preset power regulation offset.

The control module may be located on a UE.

In the embodiment, for a small-bandwidth channel or signal, the control module may be configured to set transmitted power of the small-bandwidth channel or signal to be $P'_2=P'_{min}-10 \lg(W_i/W_0)-\Delta P'$, where $P'_{min}$ is the minimum value in the multiple transmitted power constraint parameters, $W_i$ is a bandwidth of the small-bandwidth channel or a channel bandwidth occupied by the small-bandwidth signal, $W_0$ is a bandwidth of a reference data channel, and $\Delta P'$ is a preset power regulation offset.

The control module may be located on a base station.

In the embodiment, for a reservation signal, the control module may further be configured to set transmitted power of the reservation signal to be a sum of a preset power increment and a difference value between the minimum value and a preset power offset.

In the embodiment, the device may further include a reporting module, configured to report PHR to a base station, $PHR=P'_{max}-P'_{UE}$, where $P'_{max}$ is maximum transmitted power considering an unlicensed carrier spectrum threshold, and $P_{UE}$ is current transmitted power of User Equipment (UE).

The reporting module may be located on a UE.

In the embodiment, the acquisition module may further be configured to acquire corresponding unlicensed carrier availability judgment energy strength threshold values adopted when multiple signals or channels of different frequency-domain sparsity occupy an unlicensed carrier, and determine frequency-domain sparse signals or channels which are able to be borne by the unlicensed carrier according to signal strength of a neighbor node and the corresponding unlicensed carrier availability judgment energy strength threshold values adopted when multiple signals or channels of different frequency-domain sparsity occupy the unlicensed carrier.

Another embodiment of the disclosure further provide a computer storage medium, which may store a computer program, the computer program being configured to execute the abovementioned unlicensed carrier power control method of the embodiments of the disclosure.

According to the unlicensed carrier power control method and device, and storage medium provided by some embodiments of the disclosure, multiple transmitted power constraint parameters are acquired, and a minimum value in the multiple transmitted power constraint parameters is determined; and power control is performed according to the minimum value in the multiple transmitted power constraint parameters. Therefore, using opportunities of the unlicensed carrier may be increased, and performance of a communication system using an unlicensed carrier may further be improved.

DETAILED DESCRIPTION OF THE EMBODIMENTS

In the embodiments of the disclosure, multiple transmitted power constraint parameters are acquired, and a minimum value in the multiple transmitted power constraint parameters is determined; and power control is performed according to the minimum value in the multiple transmitted power constraint parameters.

Figure 1:
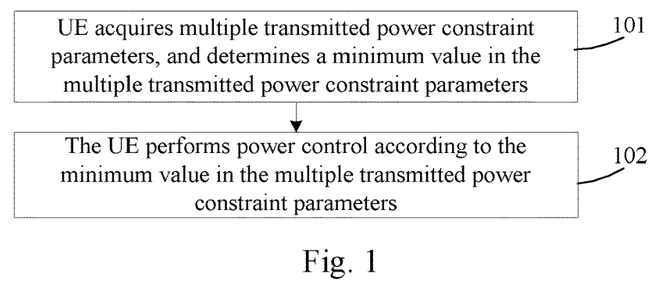
FIG. 1 is a flowchart of an unlicensed carrier power control method according to a first embodiment of the disclosure.

FIG. 1 is a flowchart of an unlicensed carrier power control method according to a first embodiment of the disclosure. As shown in FIG. 1, the unlicensed carrier power control method of the embodiment of the disclosure includes the following acts.

At act 101, UE acquires multiple transmitted power constraint parameters, and determines a minimum value in the multiple transmitted power constraint parameters.

Here, in a scenario of open loop power control, that is, when initial power of the UE is set, the multiple transmitted power constraint parameters may include:

maximum transmitted power $P_{un1}$ considering an unlicensed carrier spectrum threshold, maximum transmitted power $P_{max}$, configured by the UE, not considering the unlicensed carrier spectrum threshold and initial transmitted power $P_{init\_pc}$ not considering the unlicensed carrier spectrum threshold;

or, maximum transmitted power $P_{un\_neighbour1}$ considering an unlicensed carrier spectrum threshold of a neighbor frequency point of an unlicensed carrier spectrum, $P_{un1}$, $P_{max}$ and $P_{init\_pc}$;

or, maximum transmitted power $P_{prim1}$ considering a primary system threshold on the unlicensed carrier spectrum, $P_{un1}$, $P_{max}$ and $P_{init\_pc}$;

or, $P_{max}$ and transmitted power $P_{UN1}$ of a reference data channel.

In an embodiment, the operation that the UE acquires $P_{un1}$ includes that: the UE receives and stores $P_{un1}$ configured by a base station.

The operation that the UE acquires $P_{max}$, $P_{init\_pc}$, $P_{un\_neighbour1}$ and $P_{prim1}$ may refer to a related technology, and will not be elaborated herein.

The operation that the UE acquires $P_{UN1}$ may be implemented by executing the following acts.

The UE obtains $P_{UN1}$ by virtue of a formula $P_{UN1}=P_{init\_pc}+\beta(E_{th}-E_0)$, where $P_{UN1}$ is the transmitted power of the reference data channel in the scenario of open loop power control, and the reference data channel may be a Physical Uplink Shared Channel (PUSCH); $\beta$ is a weighting coefficient, and in an embodiment, $\beta$ is a positive number more than 1; $E_{th}$ is a preset unlicensed carrier availability judgment energy strength threshold value, and in an embodiment, $E_{th}$ may be −62 dBm; and $E_0$ is signal strength, measured by the UE, of a neighbor node of an unlicensed carrier.

In an embodiment, in a scenario of closed loop power control, the multiple transmitted power constraint parameters may include:

the maximum transmitted power $P_{un2}$ considering the unlicensed carrier spectrum threshold, $P_{max}$ and actual transmitted power $P_{pc}$ not considering the unlicensed carrier spectrum threshold;

or, the maximum transmitted power $P_{neighbour2}$ considering the unlicensed carrier spectrum threshold of the neighbor frequency point of the unlicensed carrier spectrum, $P_{un2}$, $P_{max}$ and $P_{pc}$;

or, the maximum transmitted power $P_{prim2}$ considering the primary system threshold on the unlicensed carrier spectrum, $P_{un2}$, $P_{max}$ and $P_{pc}$, a primary system being a primary system such as a radar;

or, the transmitted power $P_{UN2}$ of the reference data channel and $P_{max}$, where $P_{UN2} \geq P_{UN1}$, The operation that the UE acquires $P_{un2}$ includes that: the UE receives and stores $P_{un2}$ configured by the base station.

The operation that the UE acquires $P_{max}$, $P_{pc}$, $P_{neighbour2}$ and $P_{prim2}$ may refer to a related technology, and will not be elaborated herein.

When the multiple transmitted power constraint parameters include $P_{UN2}$ and $P_{max}$, the operation that the UE acquires $P_{UN2}$ may be implemented by executing the following acts.

The UE obtains $P_{UN2}$ by virtue of a formula $P_{UN2}=P_{pc}+\beta(E_{th}-E_0)$, where $P_{UN2}$ is the transmitted power of the reference data channel in the scenario of closed loop power control, and the reference data channel may be a PUSCH; $\beta$ is a weighting coefficient, and in an embodiment, $\beta$ is a positive integer more than 1; $E_{th}$ is a preset unlicensed carrier availability judgment energy strength threshold value; and $E_0$ is the signal strength, measured by the UE, of the neighbor node of the unlicensed carrier. That is, when a measured energy value of the unlicensed carrier is lower than a preset threshold, maximum permissible transmitted power of the unlicensed carrier where a transmitting channel or signal is located may be increased; and when the measured energy value of the unlicensed carrier is larger than the preset threshold, it may be suggested to reduce the maximum permissible transmitted power of the unlicensed carrier where the transmitting channel or the signal is located. In an embodiment, a regulation amount is a difference value between the threshold and an actual measured value, the maximum transmitted power is reduced if the measured value is slightly larger, and the transmitted power may be increased if the measured value is slightly smaller.

At act 102, the UE performs power control according to the minimum value in the multiple transmitted power constraint parameters.

The act 102 may be implemented in the following acts. The UE sets current transmitted power of the UE to be $P_1$ according to the minimum value in the multiple transmitted power constraint parameters, where $P_1=P_{min}-\Delta P$. $P_{min}$ is the minimum value in the multiple transmitted power constraint parameters. For example, when the transmitted power constraint parameters currently include $P_{un2}$, $P_{max}$ and $P_{pc}$; $P_{min}=\{P_{un2}, P_{max}, P_{pc}\}$; and $\Delta P$ is a preset power offset and may be set according to a practical condition. In an embodiment, $\Delta P$ may be [0, 3] dB, and it is indicated that no power offset is set when $\Delta P=0$.

In an embodiment, for a small-bandwidth channel or signal, the act that power control is performed according to the minimum value in the multiple transmitted power constraint parameters may includes the following acts.

Transmitted power of the small-bandwidth channel or signal is set to be $P_2=P_{min}-10\lg(W_i/W_0)-\Delta P'$, where $P_{min}$ is the minimum value in the multiple transmitted power constraint parameters, $W_i$ is a bandwidth of the small-bandwidth channel or a channel bandwidth occupied by the small-bandwidth signal, $W_0$ is a bandwidth of a reference data channel, $\Delta P'$ is a preset power regulation offset, and $\Delta P' \geq 0$. For example, in a scenario of closed loop power control, if $P_{min}=\min\{P_{un2}, P_{max}, P_{pc}\}=P_{pc\_un}$, $W_0$ is 1 MHZ and $W_i$ is 180 KHZ, then $P_2=P_{pc\_un}-10\lg(180/1000)-\Delta P'$.

In an embodiment, when the UE determines that the obtained $P_1$ is lower than a preset transmitted power threshold value $P_{th1}$ or $P_2$ is lower than a preset transmitted power threshold value $P_{th2}$, it is determined that the unlicensed carrier may not meet a throughput requirement, that is, the unlicensed carrier is unavailable. The values of $p_{th1}$ and $P_{th2}$ may be set according to a practical condition.

In an embodiment, the UE reports information indicating whether the signal strength of the neighbor node exceeds the preset signal strength threshold value $E_{th}$ or not to the base station as a reference for dynamic power control and scheduling of the base station. The information reported by the UE may include: state information indicating whether the signal strength of the neighbor node exceeds $E_{th}$ or not, information about which level is exceeded and a reporting manner. The level may be preset according to the practical condition, for example, 4 levels may be provided, and the specific level is indicated by 2bit. The reporting manner is periodical reporting or triggering-event-based reporting, and may be set according to the practical condition.

In an embodiment, the UE reports PHR to the base station as a reference for dynamic power control and scheduling of the base station, $PHR=P'_{max}-P_{UE}$, where $P'_{max}$, is maximum transmitted power considering the unlicensed carrier spectrum threshold, and $P'_{max}=\min\{P_{un}, P_{max}\}$ or is configured through high-layer signaling; $P_{UE}$ is the current transmitted power of the UE; and $P_{un}$ is maximum transmitted power considering the unlicensed carrier spectrum threshold, $P_{un}=P_{un1}$ in a scenario of open loop power control, and $P_{un}=P_{un2}$ in the scenario of closed loop power control.

In an embodiment, the UE acquires corresponding unlicensed carrier availability judgment energy strength threshold values adopted when multiple signals or channels of different frequency-domain sparsity occupy an unlicensed carrier, and determines frequency-domain sparse signals or channels which are currently able to be borne by the unlicensed carrier (or the frequency-domain sparse channels or signals for which the unlicensed carrier is available) according to currently measured signal strength of a neighbor node and the corresponding unlicensed carrier availability judgment energy strength threshold values adopted when the frequency-domain sparse signals or channels occupy the unlicensed carrier.

Here, the domain-frequency sparse signals or channels refer to that the signals and/or channels are placed at intervals or continuously occupy a part of a unit bandwidth when being mapped and sent on a frequency domain. For example, Cell Reference Signals (CRSs) of an antenna port are placed every 6 subcarriers, and belong to frequency-domain sparse signals placed at intervals. For another example, a unit frequency-domain bandwidth is 10 Resource Blocks (RBs), and if a Physical Downlink Shared Channel (PDSCH) occupies only one RB of the unit bandwidth, a frequency-domain sparse channel of a part of the unit bandwidth is continuously occupied.

The frequency-domain sparse signals or channels may include: Discovery Signals (DSs), CRSs, Channel State Information Reference Signals (CSI-RSs), Primary Synchronization Signals (PSSs), Secondary Synchronization Signals (SSSs), reservation signals, Sounding Reference Signals (SRSs), small-bandwidth data channels (PUSCHs and/or PDSCHs) and the like.

In an embodiment, the operation that the UE acquires the unlicensed carrier availability judgment energy strength threshold values corresponding to occupation of the multiple signals or channels of different frequency-domain sparsity over the unlicensed carrier may include the following acts.

The UE sets different thresholds according to a proportional relationship of a spectrum occupation density of a reference channel or signal and a spectrum density of the frequency-domain sparse channels or signals to be transmitted. A basic principle is that a threshold corresponding to sparse channels or signals may be set to be larger.

In an embodiment, the UE obtains an unlicensed carrier availability judgment energy strength threshold value corresponding to occupation of a frequency-domain sparse signal or channel over the unlicensed carrier according to $E_{th\_i}=E_{th\_RS}+10 \lg(S_0/S_i)$, where $E_{th\_i}$ is the unlicensed carrier availability judgment energy strength threshold value corresponding to occupation of the frequency-domain sparse signal or channel over the unlicensed carrier; $E_{th\_RS}$ is an unlicensed carrier availability judgment energy strength threshold value corresponding to occupation of the reference data channel over the unlicensed carrier, and the reference data channel may be a PUSCH; $S_0$ is a spectrum density of the reference data channel; and $S_i$ is a spectrum density of the frequency-domain sparse signal or channel. For example, the reference data channel is a data channel, i.e. a PUSCH, of which corresponding subcarriers are completely occupied, the frequency-domain sparse signal or channel is a single-port CRS, a spectrum density of the CRS is ⅙ of a spectrum density of the PUSCH, and $E_{th\_CRS}=E_{th\_PUSCH}+10 \lg(6)$. Therefore, if the currently measured signal strength of the neighbor node exceeds an unlicensed carrier availability judgment energy strength threshold value corresponding to occupation of the PUSCH over the unlicensed carrier, but does not exceed an unlicensed carrier availability judgment energy strength threshold value corresponding to occupation of the CRS over the unlicensed carrier, it may be determined that the current unlicensed carrier is available for sending of the CRS.

In an embodiment, for a reservation signal, the act that power control is performed according to the minimum value in the multiple transmitted power constraint parameters includes that: the UE sets transmitted power of the reservation signal to be $P_3$, $P_3=P_{min}-\Delta P+\Delta P''$, where $P_{min}$ is the minimum value in the multiple transmitted power constraint parameters; $\Delta P$ is the preset power offset, $\Delta P$ may be [0, 3] dB, and it is indicated that no power offset is set when $\Delta P=0$; and $\Delta P''$ is a preset power increase. Here, for preventing the reservation signal from being preempted, it may be suggested to ensure that a spectrum energy value of the reservation signal is not smaller than a reserved spectrum energy value of a signal to be transmitted through the unlicensed carrier, that is, it may be suggested to increase a power spectrum density of the reservation signal. In an embodiment, $\Delta P''$ may be set to be 3 dB. Increasing the transmitted power of the reservation signal to be equivalent to reserved power of the signal transmitted through the carrier may effectively implement reservation of the unlicensed carrier and prevent the unlicensed carrier from being preempted by other equipment.

Figure 2:
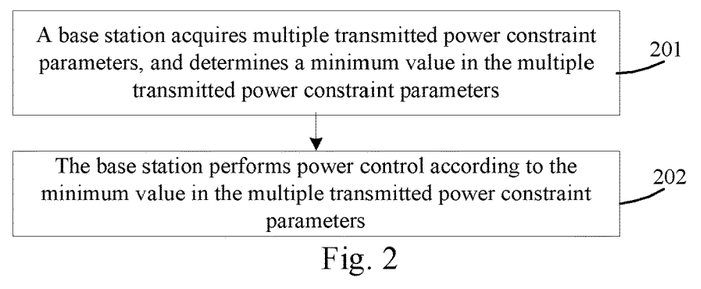
FIG. 2 is a flowchart of an unlicensed carrier power control method according to a second embodiment of the disclosure.

FIG. 2 is a flowchart of an unlicensed carrier power control method according to a second embodiment of the disclosure. As shown in FIG. 2, the unlicensed carrier power control method of the embodiment of the disclosure includes the following acts.

At act 201, a base station acquires multiple transmitted power constraint parameters, and determines a minimum value in the multiple transmitted power constraint parameters.

Here, in a scenario of open loop power control, that is, when initial power of the base station is set, the multiple transmitted power constraint parameters include:

maximum transmitted power $P_{BS1}$ considering an unlicensed carrier spectrum threshold, maximum transmitted power $P_{max\_BS}$, configured by the base station, not considering the unlicensed carrier spectrum threshold and initial transmitted power $P_{init\_BS}$ not considering the unlicensed carrier spectrum threshold;

or, maximum transmitted power $P_{BS\_neighbour1}$ considering an unlicensed carrier spectrum threshold of a neighbor frequency point of an unlicensed carrier spectrum, $P_{BS1}$, $P_{max\_BS}$ and $P_{init\_BS}$;

or, maximum transmitted power $P_{prim1\_BS}$ considering a primary system threshold on the unlicensed carrier spectrum, $P_{BS1}$, $P_{max}$ and $P_{init\_BS}$;

or $P_{max\_BS}$ and transmitted power $P_{UN1\_BS}$ of a reference data channel.

In an embodiment, the operation that the base station acquires $P_{BS1}$ includes that: the base station calculates the maximum transmitted power $P_{BS1}$ considering the unlicensed carrier spectrum threshold TH0 according to a preset unlicensed carrier availability judgment energy strength threshold value corresponding to occupation of an unlicensed carrier over the unlicensed carrier.

The operation that the base station acquires $P_{max\_BS}$, $P_{init\_BS}$, $P_{BS\_neighbour1}$ and $P_{prim1\_BS}$ may refer to a related technology, and will not be elaborated herein.

The operation that the base station acquires $P_{UN1\_BS}$ may include the following acts.

The base station obtains $P_{UN1\_BS}$ by virtue of a formula $P_{UN1\_BS}=P_{init\_BS}+\beta(E_{th}-E_0)$, where $P_{UN1\_BS}$ is the transmitted power of the reference data channel in the scenario of open loop power control, and the reference data channel may be a PDSCH; β is a weighting coefficient, and in an embodiment, β is a positive number more than 1; $E_{th}$ is a preset unlicensed carrier availability judgment energy strength threshold value; and $E_0$ is signal strength, measured by the base station, of a neighbor node of the unlicensed carrier. That is, when a measured energy value of the unlicensed carrier is lower than a preset threshold, maximum permissible transmitted power of the unlicensed carrier where a transmitting channel or signal is located may be increased; and when the measured energy value of the unlicensed carrier is larger than the preset threshold, it may be suggested to reduce the maximum permissible transmitted power of the unlicensed carrier where the transmitting channel or the signal is located. In an embodiment, a regulation amount is a difference value between the threshold and an actual measured value, the maximum transmitted power is reduced if the measured value is slightly larger, and the transmitted power may be increased if the measured value is slightly smaller.

In an embodiment, in a scenario of closed loop power control, the multiple transmitted power constraint parameters may include:

the maximum transmitted power $P_{BS2}$ considering the unlicensed carrier spectrum threshold, $P_{max\_BS}$ and actual transmitted power $P_{pc\_BS}$ not considering the unlicensed carrier spectrum threshold;

or, the maximum transmitted power $P_{BS\_neighbour2}$ considering the unlicensed carrier spectrum threshold of the neighbor frequency point of the unlicensed carrier spectrum, $P_{BS2}$, $P_{max\_BS}$ and $P_{pc\_BS}$;

or, the maximum transmitted power $P_{prim2\_BS}$ considering the primary system threshold on the unlicensed carrier spectrum, $P_{BS2}$, $P_{max\_BS}$ and $P_{pc\_BS}$, a primary system being a primary system such as a radar;

or, the transmitted power $P_{UN2\text{-}BS}$ of the reference data channel and $P_{max\_BS}$, where $P_{BS2} \geq P_{BS1}$.

The operation that the base station acquires $P_{BS2}$ includes that: the base station calculates the maximum transmitted power $P_{BS2}$ considering the unlicensed carrier spectrum threshold according to the preset unlicensed carrier availability judgment energy strength threshold value TH0 corresponding to the unlicensed carrier.

The operation that the base station acquires $P_{max\_BS}$, $P_{pc\_BS}$, $P_{BS\_neighbour2}$ and $P_{prim2\_BS}$ may refer to a related technology, and will not be elaborated herein.

When the multiple transmitted power constraint parameters include $P_{UN2\text{-}BS}$ and $P_{max}$, the operation that the base station acquires $P_{UN2\text{-}BS}$ may include the following acts.

The base station obtains $P_{UN2\text{-}BS}$ by virtue of a formula $P_{UN2\_BS} = P_{pc\_BS} + \beta(E_{th} - E_0)$, where $P_{UN2\_BS}$ is the transmitted power of the reference data channel in the scenario of closed loop power control, and the reference data channel may be a PDSCH; β is a weighting coefficient, and in an embodiment, β is a positive integer more than 1; $E_{th}$ is a preset unlicensed carrier availability judgment energy strength threshold value, and in an embodiment, and $E_{th}$ may be −62 dBm; and $E_0$ is the signal strength, measured by the base station, of the neighbor node of the unlicensed carrier.

At act 202, the base station performs power control according to the minimum value in the multiple transmitted power constraint parameters.

The act includes that: the base station sets current transmitted power of the base station to be $P'_1$ according to the minimum value in the multiple transmitted power constraint parameters, where $P'_1 = P'_{min} - \Delta P$. $P'_{min}$ is the minimum value in the multiple transmitted power constraint parameters. For example, when the transmitted power constraint parameters currently include $P_{BS2}$, $P_{max\_BS}$ and $P_{pc\_BS}$, $P_{pc\_BS}$, $P'_{min} = \{P_{BS2}, P_{max\_BS}, P_{pc\_BS}\}$; and ΔP is a preset power offset, ΔP may be set according to a practical condition, and in an embodiment, ΔP may be [0, 3] dB, and it is indicated that no power offset is set when ΔP=0.

In an embodiment, for a small-bandwidth channel or signal, the act that power control is performed according to the minimum value in the multiple transmitted power constraint parameters may include the following acts.

transmitted power of the small-bandwidth channel or signal is set to be $P'_2 = P'_{min} - 10 \lg(W_i/W_0) - \Delta P'$, where $P'_{min}$ is the minimum value in the multiple transmitted power constraint parameters, $W_i$ is a bandwidth of the small-bandwidth channel or a channel bandwidth occupied by the small-bandwidth signal, $W_0$ is a bandwidth of a reference data channel, ΔP' is a preset power regulation offset, and ΔP'≥0. For example, in a scenario of closed loop power control, if $P'_{min} = \min\{P_{BS2}, P_{max\_BS}, P_{pc\_BS}\}$, $W_0$ is 1 MHZ and $W_i$ is 180 KHZ, $P'_2 = P'_{min} - 10 \lg(180/1000) - \Delta P'$.

In an embodiment, when the base station determines that the obtained $P'_1$ is lower than a preset transmitted power threshold value $P'_{th1}$ or $P'_2$ is lower than a preset transmitted power threshold value $P'_{th2}$, it is determined that the unlicensed carrier may not meet a throughput requirement, that is, the unlicensed carrier is unavailable. The values of $P'_{th1}$ and $P'_{th2}$ may be set according to a practical condition.

In an embodiment, the base station acquires unlicensed carrier availability judgment energy strength threshold values corresponding to multiple signals or channels of different frequency-domain sparsity, and determines frequency-domain sparse signals or channels which are currently able to be borne by the unlicensed carrier (or the frequency-domain sparse channels or signals for which the unlicensed carrier is available) according to currently measured signal strength of a neighbor node and the corresponding unlicensed carrier availability judgment energy strength threshold values adopted when the frequency-domain sparse signals or channels occupy the unlicensed carrier. The domain-frequency sparse signals or channels may include: DSs, CRSS, CSI-RSs, PSSs, SSSs, reservation signals, SRSs, small-bandwidth data channels (PUSCHs and/or PDSCHs) and the like.

In an embodiment, the operation that the base station acquires the unlicensed carrier availability judgment energy strength threshold values corresponding to the multiple signals or channels of different frequency-domain sparsity may include the following acts.

The base station sets different thresholds according to a proportional relationship of a spectrum occupation density of a reference channel or signal and a spectrum occupation density of the frequency-domain sparse channels or signals to be transmitted. A basic principle is that a threshold corresponding to sparse channels or signals may be set to be larger.

In an embodiment, the base station obtains an unlicensed carrier availability judgment energy strength threshold value corresponding to occupation of a frequency-domain sparse signal or channel over the unlicensed carrier according to $E'_{th\_i} = E'_{th\_RS} + 10 \lg(S_0/S_i)$, where $E'_{th\_i}$ is the unlicensed carrier availability judgment energy strength threshold value corresponding to the frequency-domain sparse signal or channel; $E'_{th\_RS}$ is an unlicensed carrier availability judgment energy strength threshold value corresponding to the reference data channel, and the reference data channel may be a PDSCH; $S_0$ is a spectrum density of the reference data channel; and $S_i$ is a spectrum density of the frequency-domain sparse signal or channel. For example, the reference data channel is a data channel, i.e. a PDSCH, of which corresponding subcarriers are completely occupied, the frequency-domain sparse signal or channel is a single-port CRS, a spectrum density of the CRS is ⅙ of a spectrum density of the PDSCH, and $E'_{th\_CRS}=E'_{th\_PUSCH}+10 \lg(6)$. Therefore, if the currently measured signal strength of the neighbor node exceeds an unlicensed carrier availability judgment energy strength threshold value corresponding to the PDSCH, but does not exceed an unlicensed carrier availability judgment energy strength threshold value corresponding to the CRS, it may be determined that the current unlicensed carrier is available for sending of the CRS.

In an embodiment, for a reservation signal, the act that power control is performed according to the minimum value in the multiple transmitted power constraint parameters includes that: the base station sets transmitted power of the reservation signal to be $P'_3$, $P'_3=P'_{min}-\Delta P+\Delta P'''$, where $P'_{min}$ is the minimum value in the multiple transmitted power constraint parameters; $\Delta P$ is the preset power offset, and $\Delta P$ may be [0, 3] dB, and it is indicated that no power offset is set when $\Delta P=0$; and $\Delta P'''$ is a preset power increase. Here, for preventing the reservation signal from being preempted, it may be suggested to ensure that a spectrum energy value of the reservation signal is not smaller than a reserved signal spectrum energy value, that is, it may be suggested to increase a power spectrum density of the reservation signal. In an embodiment, $\Delta P'''$ may be set to be 3 dB. Increasing the transmitted power of the reservation signal to be equivalent to reserved power of a signal transmitted through the carrier may effectively implement reservation of the unlicensed carrier and prevent the unlicensed carrier from being preempted by other equipment.

Figure 3:
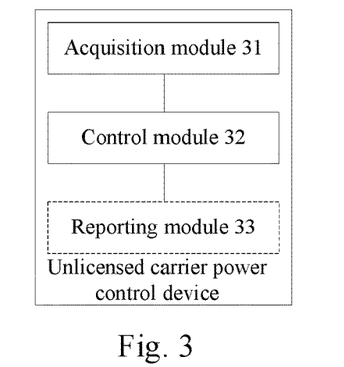
FIG. 3 is a structure diagram of an unlicensed carrier power control device according to a first embodiment of the disclosure.

FIG. 3 is a structure diagram of an unlicensed carrier power control device according to a first embodiment of the disclosure. The device is located on UE. As shown in FIG. 3, the unlicensed carrier power control device of the embodiment of the disclosure includes an acquisition module 31 and a control module 32.

The acquisition module 31 is configured to acquire multiple transmitted power constraint parameters, and determine a minimum value in the multiple transmitted power constraint parameters.

The control module 32 is configured to perform power control according to the minimum value in the multiple transmitted power constraint parameters.

In an embodiment, in a scenario of open loop power control, that is, when initial power of the UE is set, the multiple transmitted power constraint parameters may include:

maximum transmitted power $P_{un1}$ considering an unlicensed carrier spectrum threshold, maximum transmitted power $P_{max}$, configured by the UE, not considering the unlicensed carrier spectrum threshold and initial transmitted power $P_{init\_pc}$, not considering the unlicensed carrier spectrum threshold;

or, maximum transmitted power $P_{un\_neighbour1}$ considering an unlicensed carrier spectrum threshold of a neighbor frequency point of an unlicensed carrier spectrum, $P_{un1}$, $P_{max}$, and $P_{init\_pc}$;

or, maximum transmitted power $P_{prim1}$ considering a primary system threshold on the unlicensed carrier spectrum, $P_{un1}$, $P_{max}$ and $P_{init\_pc}$;

or, $P_{max}$ and transmitted power $P_{UN1}$ of a reference data channel.

In an embodiment, the operation that the acquisition module 31 acquires $P_{un1}$ includes that: the acquisition module 31 receives and stores $P_{un1}$ configured by a base station.

In an embodiment, in a scenario of open loop power control, when the multiple transmitted power constraint parameters include $P_{UN1}$ and $P_{max}$, the acquisition module 31 obtains $P_{UN1}$ according to $P_{UN1}=P_{init\_pc}+\beta(E_{th}-E_0)$, where $P_{UN1}$ is the transmitted power of the reference data channel in the scenario of open loop power control, and the reference data channel may be a PUSCH; $\beta$ is a weighting coefficient, and in an embodiment, $\beta$ is a positive number more than 1; $E_{th}$ is a preset unlicensed carrier availability judgment energy strength threshold value, and in an embodiment, $E_{th}$ may be −62 dBm; and $E_0$ is signal strength, measured by the acquisition module 31, of a neighbor node of an unlicensed carrier.

In an embodiment, in a scenario of closed loop power control, the multiple transmitted power constraint parameters may include:

the maximum transmitted power $P_{un2}$ considering the unlicensed carrier spectrum threshold, $P_{max}$ and actual transmitted power $P_{pc}$ not considering the unlicensed carrier spectrum threshold;

or, the maximum transmitted power $P_{neighbour2}$ considering the unlicensed carrier spectrum threshold of the neighbor frequency point of the unlicensed carrier spectrum, $P_{un2}$, $P_{max}$ and $P_{pc}$;

or, the maximum transmitted power $P_{prim2}$ considering the primary system threshold on the unlicensed carrier spectrum, $P_{un2}$, $P_{max}$ and $P_{pc}$, a primary system being a primary system such as a radar;

or, the transmitted power $P_{UN2}$ of the reference data channel and $P_{max}$, where $P_{UN2} \geq P_{UN1}$.

The acquisition module 31 receives and stores $P_{un2}$ configured by the base station.

In an embodiment, in a scenario of closed loop power control, when the multiple transmitted power constraint parameters include $P_{UN2}$ and $P_{max}$, the acquisition module 31 obtains $P_{UN2}$ according to $P_{UN2}=P_{pc}+\beta(E_{th}-E_0)$, where $P_{UN2}$ is the transmitted power of the reference data channel in the scenario of closed loop power control, and the reference data channel may be a PUSCH; $\beta$ is a weighting coefficient, and in an embodiment, $\beta$ is a positive integer more than 1; $E_{th}$ is a preset unlicensed carrier availability judgment energy strength threshold value, and in an embodiment, $E_{th}$ may be −62 dBm; and $E_0$ is the signal strength, measured by the UE, of the neighbor node of the unlicensed carrier.

In an embodiment, the operation that the control module 32 performs power control according to the minimum value in the multiple transmitted power constraint parameters may include the following acts.

The control module 32 sets current transmitted power of the UE to be $P_1$ according to the minimum value in the multiple transmitted power constraint parameters, where $P_1=P_{min}-\Delta P$. $P_{min}$ is the minimum value in the multiple transmitted power constraint parameters. For example, when the transmitted power constraint parameters currently include $P_{un2}$, $P_{max}$ and $P_{pc}$, $P_{min}=\{P_{un2}, P_{max}, P_{pc}\}$; and $\Delta P$ is a preset power offset and may be set according to a practical condition. In an embodiment, $\Delta P$ may be [0, 3] dB, and it is indicated that no power offset is set when $\Delta P=0$.

In an embodiment, for a small-bandwidth channel or signal, the operation that the control module 32 performs power control according to the minimum value in the multiple transmitted power constraint parameters may include the following acts.

The control module 32 sets transmitted power of the small-bandwidth channel or signal to be $P_2=P_{min}-10 \lg(W_i/W_0)-\Delta P'$, where $P_{min}$ is the minimum value in the multiple transmitted power constraint parameters, $W_i$ is a bandwidth of the small-bandwidth channel or a channel bandwidth occupied by the small-bandwidth signal, $W_0$ is a bandwidth of a reference data channel, $\Delta P'$ is a preset power regulation offset, and $\Delta P' \geq 0$. For example, in a scenario of closed loop power control, if $P_{min}=\min\{P_{un2}, P_{max}, P_{pc}\}=P_{pc\_un}$, $W_0$ is 1 MHZ and $W_i$ is 180 KHZ, then $P_2=P_{pc\_un}-10 \lg(180/1000)-\Delta P'$.

In an embodiment, when the control module 32 determines that the obtained $P_1$ is lower than a preset transmitted power threshold value $P_{th1}$ or $P_2$ is lower than a preset transmitted power threshold value $P_{th2}$, it is determined that the unlicensed carrier may not meet a throughput requirement, that is, the unlicensed carrier is unavailable. The values of $P_{th1}$ and $P_{th2}$ may be set according to a practical condition.

In an embodiment, the device further includes a reporting module 33, configured to report information indicating whether the signal strength of the neighbor node exceeds the preset signal strength threshold value $E_{th}$ or not to the base station as a reference for dynamic power control and scheduling of the base station. The information reported by the UE includes: state information indicating whether the signal strength of the neighbor node exceeds $E_{th}$ or not, information about which level is exceeded and a reporting manner. The level may be preset according to the practical condition, for example, 4 levels may be provided, and the specific level is indicated by 2 bit. The reporting manner is periodical reporting or triggering-event-based reporting, and may be set according to the practical condition.

In an embodiment, the reporting module 33 is further configured to report PHR to the base station as a reference for dynamic power control and scheduling of the base station, $PHR=P'_{max}-P_{UE}$, where $P'_{max}$ is maximum transmitted power considering the unlicensed carrier spectrum threshold, and $P'_{max}=\min\{P_{un}, P_{max}\}$ or is configured through high-layer signaling; $P_{UE}$ is the current transmitted power of the UE; and $P_{un}$ is the maximum transmitted power considering the unlicensed carrier spectrum threshold, $P_{un}=P_{un1}$ in a scenario of open loop power control, and $P_{un}=P_{un2}$ in the scenario of closed loop power control.

In an embodiment, the acquisition module 31 is further configured to acquire corresponding unlicensed carrier availability judgment energy strength threshold values adopted when multiple signals or channels of different frequency-domain sparsity occupy an unlicensed carrier, and determine frequency-domain sparse signals or channels which are currently able to be borne by the unlicensed carrier according to currently measured signal strength of a neighbor node and the corresponding unlicensed carrier availability judgment energy strength threshold values adopted when the frequency-domain sparse signals or channels occupy the unlicensed carrier. The frequency-domain sparse signals or channels may include: DSs, CRSS, CSI-RSs, PSSs, SSSs, reservation signals and the like.

In an embodiment, the operation that the acquisition module 31 acquires the unlicensed carrier availability judgment energy strength threshold values corresponding to occupation of the multiple signals or channels of different frequency-domain sparsity over the unlicensed carrier may include the following acts.

The acquisition module 31 sets different thresholds according to a proportional relationship of a spectrum occupation density of a reference channel or signal and a spectrum occupation density of the frequency-domain sparse channels or signals to be transmitted.

In an embodiment, the acquisition module 31 obtains an unlicensed carrier availability judgment energy strength threshold value corresponding to occupation of a frequency-domain sparse signal or channel over the unlicensed carrier according to $E_{th\_i}=E_{th\_RS}+10 \lg(S_0/S_i)$, where $E_{th\_i}$ is the unlicensed carrier availability judgment energy strength threshold value corresponding to occupation of the frequency-domain sparse signal or channel over the unlicensed carrier; $E_{th\_RS}$ is an unlicensed carrier availability judgment energy strength threshold value corresponding to occupation of the reference data channel over the unlicensed carrier, and the reference data channel may be a PUSCH; $S_0$ is a spectrum density of the reference data channel; and $S_i$ is a spectrum density of the frequency-domain sparse signal or channel. For example, the reference data channel is a data channel, i.e. a PUSCH, of which corresponding subcarriers are completely occupied, the frequency-domain sparse signal or channel is a single-port CRS, a spectrum density of the CRS is ⅙ of a spectrum density of the PUSCH, and $E_{th\_CRS}=E_{th\_PUSCH}+10 \lg(6)$. Therefore, if the currently measured signal strength of the neighbor node exceeds an unlicensed carrier availability judgment energy strength threshold value corresponding to occupation of the PUSCH over the unlicensed carrier, but does not exceed an unlicensed carrier availability judgment energy strength threshold value corresponding to occupation of the CRS over the unlicensed carrier, it may be determined that the current unlicensed carrier is available for sending of the CRS.

In an embodiment, for a reservation signal, the operation that the control module 32 performs power control according to the minimum value in the multiple transmitted power constraint parameters includes that: the control module 32 sets transmitted power of the reservation signal to be $P_3$, $P_3=P_{min}-\Delta P+\Delta P'$, where $P_{min}$ is the minimum value in the multiple transmitted power constraint parameters; $\Delta P$ is the preset power offset, and $\Delta P$ may be [0, 3] dB, and it is indicated that no power offset is set when $\Delta P=0$; and $\Delta P'''$ is a preset power increase. Here, for preventing the reservation signal from being preempted, it may be suggested to ensure that a spectrum energy value of the reservation signal is not smaller than a reserved signal spectrum energy value, that is, it may be suggested to increase a power spectrum density of the reservation signal. In an embodiment, $\Delta P'''$ may be set to be 3 dB.

Figure 4:
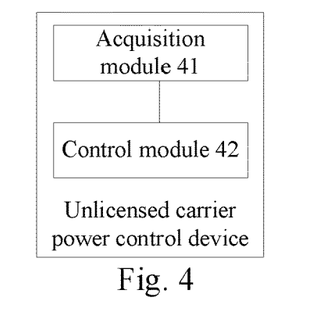
FIG. 4 is a structure diagram of an unlicensed carrier power control device according to a second embodiment of the disclosure.

FIG. 4 is a structure diagram of an unlicensed carrier power control device according to a second embodiment of the disclosure. As shown in FIG. 4, the unlicensed carrier power control device of the embodiment of the disclosure includes an acquisition module 41 and a control module 42.

The acquisition module 41 is configured to acquire multiple transmitted power constraint parameters, and determine a minimum value in the multiple transmitted power constraint parameters.

The control module 42 is configured to perform power control according to the minimum value in the multiple transmitted power constraint parameters.

In an embodiment, in a scenario of open loop power control, that is, when initial power of the base station is set, the multiple transmitted power constraint parameters may include:

maximum transmitted power $P_{BS1}$ considering an unlicensed carrier spectrum threshold, maximum transmitted power $P_{max\_BS}$, configured by the base station, not considering the unlicensed carrier spectrum threshold and initial transmitted power $P_{init\_BS}$ not considering the unlicensed carrier spectrum threshold;

or, maximum transmitted power $P_{BS\_neighbour1}$ considering an unlicensed carrier spectrum threshold of a neighbor frequency point of an unlicensed carrier spectrum, $P_{BS1}$, $P_{max\_BS}$ and $P_{init\_BS}$;

or, maximum transmitted power $P_{prim1\_BS}$ considering a primary system threshold on the unlicensed carrier spectrum, $P_{BS1}$, $P_{max}$ and $P_{init\_BS}$;

or, $P_{max\_BS}$ and transmitted power $P_{UN1\_BS}$ of a reference data channel.

In an embodiment, the operation that the acquisition module 41 acquires $P_{BS1}$ includes that: the acquisition module 41 calculates the maximum transmitted power $P_{BS1}$ considering the unlicensed carrier spectrum threshold TH0 according to a preset unlicensed carrier availability judgment energy strength threshold value corresponding to occupation over an unlicensed carrier.

The operation that the acquisition module 41 acquires $P_{max\_BS}$, $P_{init\_BS}$, $P_{BS\_neighbour1}$ and $P_{prim1\_BS}$ may refer to a related technology, and will not be elaborated herein.

The operation that the acquisition module 41 acquires $P_{UN1\_BS}$ may include the following acts.

the acquisition module 41 obtains $P_{UN1\_BS}$ by virtue of a formula $P_{UN1\_BS}=P_{init\_BS}+\beta(E_{th}-E_0)$, where $P_{UN1\_BS}$ is the transmitted power of the reference data channel in the scenario of open loop power control, and the reference data channel may be a PDSCH; $\beta$ is a weighting coefficient, and in an embodiment, $\beta$ is a positive number more than 1; $E_{th}$ is a preset unlicensed carrier availability judgment energy strength threshold value, and in an embodiment, $E_{th}$ may be −62 dBm; and $E_0$ is signal strength, measured by the acquisition module 41, of a neighbor node of the unlicensed carrier.

In an embodiment, in a scenario of closed loop power control, the multiple transmitted power constraint parameters may include:

the maximum transmitted power $P_{BS2}$ considering the unlicensed carrier spectrum threshold, $P_{max\_BS}$ and actual transmitted power $P_{pc\_BS}$ not considering the unlicensed carrier spectrum threshold;

or, the maximum transmitted power $P_{BS\_neighbour2}$ considering the unlicensed carrier spectrum threshold of the neighbor frequency point of the unlicensed carrier spectrum, $P_{BS2}$, $P_{max\_BS}$ and $P_{pc\_BS}$;

or, the maximum transmitted power $P_{prim2\_BS}$ considering the primary system threshold on the unlicensed carrier spectrum, $P_{BS2}$, $P_{max\_BS}$ and $P_{pc\_BS}$, a primary system being a primary system such as a radar;

or, the transmitted power $P_{UN2\_BS}$ of the reference data channel and $P_{max\_BS}$, where $P_{BS2} \leq P_{BS1}$.

The operation that the acquisition module 41 acquires $P_{BS2}$ includes that: the acquisition module 41 calculates the maximum transmitted power $P_{BS2}$ considering the unlicensed carrier spectrum threshold according to the preset unlicensed carrier availability judgment energy strength threshold value TH0 corresponding to occupation over the unlicensed carrier.

The operation that the acquisition module 41 acquires $P_{max\_BS}$, $P_{pc\_BS}$, $P_{BS\_neighbour2}$ and $P_{prim2\_BS}$ may refer to a related technology, and will not be elaborated herein.

When the multiple transmitted power constraint parameters include $P_{UN2-BS}$ and $P_{max}$, the operation that the acquisition module 41 acquires $P_{UN2-BS}$ may include the following acts.

The acquisition module 41 obtains $P_{UN2-BS}$ by virtue of a formula $P_{UN2\_BS}=P_{pc\_BS}+\beta(E_{th}-E_0)$, where $P_{UN2-BS}$ is the transmitted power of the reference data channel in the scenario of closed loop power control, and the reference data channel may be a PDSCH; $\beta$ is a weighting coefficient, and in an embodiment, $\beta$ is a positive integer more than 1; $E_{th}$ is a preset unlicensed carrier availability judgment energy strength threshold value, and in an embodiment, and $E_{th}$ may be −62 dBm; and $E_0$ is the signal strength, measured by the acquisition module 41, of the neighbor node of the unlicensed carrier.

The operation that the acquisition module 41 performs power control according to the minimum value in the multiple transmitted power constraint parameters may include the following acts.

The acquisition module 41 sets current transmitted power of the base station to be $P'_1$ according to the minimum value in the multiple transmitted power constraint parameters, where $P'_1=P'_{min}-\Delta P$. $P'_{min}$ is the minimum value in the multiple transmitted power constraint parameters. For example, when the transmitted power constraint parameters currently include $P_{BS2}$, $P_{max\_BS}$ and $P_{pc\_BS}$, $P'_{min}=\{P_{BS2}, P_{max\_BS}, P_{pc\_BS}\}$; and is a $\Delta P$ is a preset power offset, $\Delta P$ may be set according to a practical condition, and in an embodiment, $\Delta P$ may be [0, 3] dB, and it is indicated that no power offset is set when $\Delta P=0$.

In an embodiment, for a small-bandwidth channel or signal, the operation that the acquisition module 42 performs power control according to the minimum value in the multiple transmitted power constraint parameters may include the following acts.

The acquisition module 42 sets transmitted power of the small-bandwidth channel or signal to be $P'_2=P'_{min}-10\lg(W_i/W_0)-\Delta P'$, where $P'_{min}$ is the minimum value in the multiple transmitted power constraint parameters, $W_i$ is a bandwidth of the small-bandwidth channel or a channel bandwidth occupied by the small-bandwidth signal, $W_0$ is a bandwidth of a reference data channel, $\Delta P'$ is a preset power regulation offset, and $\Delta P' \geq 0$. For example, in a scenario of closed loop power control, if $P'_{min}=\min\{P_{BS2}, P_{max\_BS}, P_{pc\_BS}\}$, $W_0$ is 1 MHZ and $W_i$ is 180 KHZ, $P'_2=P'_{min}-10\lg(180/1000)-\Delta P'$.

In an embodiment, when the acquisition module 42 determines that the obtained $P'_1$ is lower than a preset transmitted power threshold value $P'_{th1}$ or $P'_2$ is lower than a preset transmitted power threshold value $P'_{th2}$, it is determined that the unlicensed carrier may not meet a throughput requirement, that is, the unlicensed carrier is unavailable. The values of $P'_{th1}$ and $P'_{th2}$ may be set according to a practical condition.

In an embodiment, the acquisition module 41 is further configured to acquire corresponding unlicensed carrier availability judgment energy strength threshold values adopted when multiple signals or channels of different frequency-domain sparsity occupy an unlicensed carrier, and determine frequency-domain sparse signals or channels which are currently able to be borne by the unlicensed carrier according to currently measured signal strength of a neighbor node and the corresponding unlicensed carrier availability judgment energy strength threshold values adopted when the frequency-domain sparse signals or channels occupy the unlicensed carrier. The domain-frequency sparse signals or channels may include: Demodulation Reference Signals (DRSs), CRSs, CSI-RSs, PSSs, SSSs, reservation signals and the like.

In an embodiment, the operation that the acquisition module 41 acquires the unlicensed carrier availability judgment energy strength threshold values corresponding to occupation of the multiple signals or channels of different frequency-domain sparsity over the unlicensed carrier may include the following acts.

The acquisition module 41 sets different thresholds according to a proportional relationship of a spectrum occupation density of a reference channel or signal and a spectrum occupation density of the frequency-domain sparse channels or signals to be transmitted.

In an embodiment, the acquisition module 41 obtains an unlicensed carrier availability judgment energy strength threshold value corresponding to occupation of a frequency-domain sparse signal or channel over the unlicensed carrier according to $E'_{th\_i} + E'_{th\_RS} + 10 \lg(S_0/S_i)$, where $E'_{th\_i}$ is the unlicensed carrier availability judgment energy strength threshold value corresponding to occupation of the frequency-domain sparse signal or channel over the unlicensed carrier; $E'_{th\_RS}$ is an unlicensed carrier availability judgment energy strength threshold value corresponding to occupation of the reference data channel over the unlicensed carrier, and the reference data channel may be a PDSCH; $S_0$ is a spectrum density of the reference data channel; and $S_i$ is a spectrum density of the frequency-domain sparse signal or channel. For example, the reference data channel is a data channel, i.e. a PDSCH, of which corresponding subcarriers are completely occupied, the frequency-domain sparse signal or channel is a single-port CRS, a spectrum density of the CRS is ⅙ of a spectrum density of the PDSCH, and $E'_{th\_CRS} = E'_{th\_PUSCH} 10 \lg(6)$. Therefore, if the currently measured signal strength of the neighbor node exceeds an unlicensed carrier availability judgment energy strength threshold value corresponding to occupation of the PDSCH over the unlicensed carrier, but does not exceed an unlicensed carrier availability judgment energy strength threshold value corresponding to occupation of the CRS over the unlicensed carrier, it may be determined that the current unlicensed carrier is available for sending of the CRS.

In an embodiment, for a reservation signal, the operation that the control module 42 performs power control according to the minimum value in the multiple transmitted power constraint parameters may include the following acts.

The control module 42 sets transmitted power of the reservation signal to be $P'_3$, $P'_3 = P'_{min} - \Delta P + \Delta P'''$, where $P'_{min}$ is the minimum value in the multiple transmitted power constraint parameters; $\Delta P$ is the preset power offset, and $\Delta P$ may be [0, 3] dB, and it is indicated that no power offset is set when $\Delta P = 0$; and $\Delta P'''$ is a preset power increase. Here, for preventing the reservation signal from being preempted, it may be suggested to ensure that a spectrum energy value of the reservation signal is not smaller than a reserved signal spectrum energy value, that is, it may be suggested to increase a power spectrum density of the reservation signal. In an embodiment, $\Delta P'''$ may be set to be 3 dB.

The acquisition module 31, control module 32, reporting module 33, acquisition 41 and control module 42 disclosed in the embodiments of the disclosure may all be implemented by a processor, and of course, may also be implemented by a specific logic circuit. The processor may be a processor on a mobile terminal or a server, and during a practical application, the processor may be a Central Processing Unit (CPU), a Micro Processing Unit (MPU), a Digital Signal Processor (DSP), a Field-Programmable Gate Array (FPGA) and the like.

In the embodiments of the disclosure, if being implemented in form of software function module and sold or used as an independent product, the unlicensed carrier power control method may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer equipment (which may be a personal computer, a server, network equipment and the like) to execute all or part of the method in each embodiment of the disclosure. The abovementioned storage medium includes: various media capable of storing program codes such as a U disk, a mobile hard disk, a Read-Only Memory (ROM), a magnetic disk or an optical disk. Therefore, the embodiments of the disclosure are not limited to any specific hardware and software combination.

Correspondingly, an embodiment of the disclosure further provides a computer storage medium, in which a computer program is stored, the computer program being configured to execute the unlicensed carrier power control method of the embodiment of the disclosure.

The above is only the exemplary embodiment of the disclosure and not intended to limit the scope of protection of the disclosure.

What is claimed is:

1. An unlicensed carrier power control method, comprising:
   acquiring multiple transmitted power constraint parameters, and determining a minimum value in the multiple transmitted power constraint parameters; and
   performing power control according to the minimum value in the multiple transmitted power constraint parameters;
   wherein, in a scenario of open loop power control, when the multiple transmitted power constraint parameters comprise transmitted power of a reference data channel and maximum transmitted power not considering an unlicensed carrier spectrum threshold, User Equipment (UE) obtains $P_{UN1}$ according to $P_{UN1} = P_{init\_pc} + \beta(E_{th} - E_0)$, where $P_{UN1}$ is the transmitted power of the reference data channel in the scenario of open loop power control, $\beta$ is a weighting coefficient, $E_{th}$ is a preset unlicensed carrier availability judgment energy strength threshold value, $E_0$ is signal strength, measured at an unlicensed carrier, of a neighbor node, and $P_{init\_pc}$ is initial transmitted power not considering the unlicensed carrier spectrum threshold;
   wherein, in a scenario of open loop power control, when the multiple transmitted power constraint parameters comprise transmitted power of a reference data channel and maximum transmitted power not considering an unlicensed carrier spectrum threshold, a base station obtains $P_{UN1\_BS}$ according to $P_{UN1\_BS} = P_{init\_BS} + \beta(E_{th} - E_0)$, where $P_{UN1\_BS}$ is the transmitted power of the reference data channel in the scenario of open loop power control, $\beta$ is a weighting coefficient, $E_{th}$ is a preset unlicensed carrier availability judgment energy strength threshold value, $E_0$ is signal strength, measured at an unlicensed carrier, of a neighbor node, and $P_{init\_BS}$ is initial transmitted power not considering the unlicensed carrier spectrum threshold;

wherein, in a scenario of closed loop power control, when the multiple transmitted power constraint parameters comprise transmitted power of a reference data channel and maximum transmitted power not considering an unlicensed carrier spectrum threshold, the UE obtains $P_{UN2}$ according to $P_{UN2}=P_{pc}+\beta(E_{th}-E_0)$, where $P_{UN2}$ is the transmitted power of the reference data channel in the scenario of closed loop power control, $\beta$ is a weighting coefficient, $E_{th}$ is a preset unlicensed carrier availability judgment energy strength threshold value, $P_{pc}$ is the actual transmitted power not considering the unlicensed carrier spectrum threshold, and $E_0$ is signal strength, measured at an unlicensed carrier, of a neighbor node;

wherein, in a scenario of closed loop power control, when the multiple transmitted power constraint parameters comprise transmitted power of a reference data channel and maximum transmitted power not considering an unlicensed carrier spectrum threshold, the base station obtains $P_{UN2\_BS}$ according to $P_{UN2\_BS}=P_{pc\_BS}+\beta(E_{th}-E_0)$, where $P_{UN2\_BS}$ is the transmitted power of the reference data channel in the scenario of closed loop power control, $\beta$ is a weighting coefficient, $E_{th}$ is a preset unlicensed carrier availability judgment energy strength threshold value, $P_{pc\_BS}$ is actual transmitted power not considering the unlicensed carrier spectrum threshold, and $E_0$ is signal strength, measured at an unlicensed carrier, of a neighbor node.

2. The method as claimed in claim 1, wherein performing power control according to the minimum value in the multiple transmitted power constraint parameters comprises: setting current transmitted power to be a difference value between the minimum value and a preset power offset according to the minimum value in the multiple transmitted power constraint parameters.

3. The method as claimed in claim 1, wherein, for a small-bandwidth channel or signal, performing power control according to the minimum value in the multiple transmitted power constraint parameters comprises:

setting transmitted power of the small-bandwidth channel or signal to be $P_2=P_{min}-10\lg(W_i/W_0)-\Delta P'$, where $P_{min}$ is the minimum value in the multiple transmitted power constraint parameters, $W_i$ is a bandwidth of the small-bandwidth channel or a channel bandwidth occupied by the small-bandwidth signal, $W_0$ is a bandwidth of a reference data channel, and $\Delta P'$ is a preset power regulation offset;

wherein an act of executing power control according to the minimum value in the multiple transmitted power constraint parameters is performed by User Equipment (UE).

4. The method as claimed in claim 1, wherein, for a small-bandwidth channel or signal, performing power control according to the minimum value in the multiple transmitted power constraint parameters comprises:

setting transmitted power of the small-bandwidth channel or signal to be $P'_2=P'_{min}-10\lg(W_i/W_0)-\Delta P'$, where $P'_{min}$ is the minimum value in the multiple transmitted power constraint parameters, $W_i$ is a bandwidth of the small-bandwidth channel or a channel bandwidth occupied by the small-bandwidth signal, $W_0$ is a bandwidth of a reference data channel, and $\Delta P'$ is a preset power regulation offset; and wherein an act of executing power control according to the minimum value in the multiple transmitted power constraint parameters is performed by a base station.

5. The method as claimed in claim 1, wherein, for a reservation signal, performing power control according to the minimum value in the multiple transmitted power constraint parameters comprises:

setting transmitted power of the reservation signal to be a sum of a preset power increment and a difference value between the minimum value and a preset power offset.

6. The method as claimed in claim 1, further comprising: reporting, by User Equipment (UE), Power Headroom Report (PHR) to a base station, wherein $PHR=P'_{max}-P_{UE}$, where $P'_{max}$ is maximum transmitted power considering an unlicensed carrier spectrum threshold, and $P_{UE}$ is current transmitted power of the UE.

7. The method as claimed in claim 1, further comprising: acquiring corresponding unlicensed carrier availability judgment energy strength threshold values adopted when multiple signals or channels of different frequency-domain sparsity occupy an unlicensed carrier, and determining frequency-domain sparse signals or channels which are able to be borne by the unlicensed carrier according to signal strength of a neighbor node and the corresponding unlicensed carrier availability judgment energy strength threshold values adopted when multiple signals or channels of different frequency-domain sparsity occupy the unlicensed carrier.

8. A non-volatile computer storage medium, in which a computer-executable instruction is stored, the computer-executable instruction being configured to execute the unlicensed carrier power control method as claimed in claim 1.

9. An unlicensed carrier power control device, comprising: a hardware processor, configured to perform programming modules stored in a memory, wherein the programming modules comprise: an acquisition module and a control module, wherein the acquisition module is configured to acquire multiple transmitted power constraint parameters, and determine a minimum value in the multiple transmitted power constraint parameters; and the control module is configured to perform power control according to the minimum value in the multiple transmitted power constraint parameters;

wherein, in a scenario of open loop power control, when the multiple transmitted power constraint parameters comprise transmitted power of a reference data channel and maximum transmitted power not considering an unlicensed carrier spectrum threshold, User Equipment (UE) obtains $P_{UN1}$ according to $P_{UN1}=P_{init\_pc}+\beta(E_{th}-E_0)$, where $P_{UN1}$ is the transmitted power of the reference data channel in the scenario of open loop power control, $\beta$ is a weighting coefficient, $E_{th}$ is a preset unlicensed carrier availability judgment energy strength threshold value, $E_0$ is signal strength, measured at an unlicensed carrier, of a neighbor node, and $P_{init\_pc}$ is initial transmitted power not considering the unlicensed carrier spectrum threshold;

wherein, in a scenario of open loop power control, when the multiple transmitted power constraint parameters comprise transmitted power of a reference data channel and maximum transmitted power not considering an unlicensed carrier spectrum threshold, a base station obtains $P_{UN1\_BS}$ according to $P_{UN1\_BS}+\beta(E_{th}-E_0)$, where $P_{UN1\_BS}$ is the transmitted power of the reference data channel in the scenario of open loop power control, $\beta$ is a weighting coefficient, $E_{th}$ is a preset unlicensed carrier availability judgment energy strength threshold value, $E_0$ is signal strength, measured at an unlicensed carrier, of a neighbor node, and $P_{init\_BS}$ is initial transmitted power not considering the unlicensed carrier spectrum threshold;

wherein, in a scenario of closed loop power control, when the multiple transmitted power constraint parameters comprise transmitted power of a reference data channel and maximum transmitted power not considering an unlicensed carrier spectrum threshold, the UE obtains $P_{UN2}$ according to $P_{UN2}=P_{pc}+\beta(E_{th}-E_0)$ where $P_{UN2}$ is the transmitted power of the reference data channel in the scenario of closed loop power control, $\beta$ is a weighting coefficient, $E_{th}$ is a preset unlicensed carrier availability judgment energy strength threshold value, $P_{pc}$ is the actual transmitted power not considering the unlicensed carrier spectrum threshold, and $E_0$ is signal strength, measured at an unlicensed carrier, of a neighbor node;

wherein, in a scenario of closed loop power control, when the multiple transmitted power constraint parameters comprise transmitted power of a reference data channel and maximum transmitted power not considering an unlicensed carrier spectrum threshold, the base station obtains $P_{UN2\_BS}$ according to $P_{UN2\_BS}=P_{pc\_BS}+\beta(E_{th}-E_0)$, where $P_{UN2\_BS}$ is the transmitted power of the reference data channel in the scenario of closed loop power control, $\beta$ is a weighting coefficient, $E_{th}$ is a preset unlicensed carrier availability judgment energy strength threshold value, $P_{pc\_BS}$ is actual transmitted power not considering the unlicensed carrier spectrum threshold, and $E_0$ is signal strength, measured at an unlicensed carrier, of a neighbor node.

10. The device as claimed in claim 9, wherein, for a small-bandwidth channel or signal, the control module is configured to set transmitted power of the small-bandwidth channel or signal to be $P_2=P_{min}-10\ lg(W_i/W_0)-\Delta P'$, where $P_{min}$ is the minimum value in the multiple transmitted power constraint parameters, $W_i$ is a bandwidth of the small-bandwidth channel or a channel bandwidth occupied by the small-bandwidth signal, $W_0$ is a bandwidth of a reference data channel, and $\Delta P'$ is a preset power regulation offset; and the control module is located on User Equipment (UE).

11. The device as claimed in claim 9, wherein, for a small-bandwidth channel or signal, the control module is configured to set transmitted power of the small-bandwidth channel or signal to be $P'_2=P'_{min}-10\ lg(W_i/W_0)-\Delta P'$, where $P'_{min}$ is the minimum value in the multiple transmitted power constraint parameters, $W_i$ is a bandwidth of the small-bandwidth channel or a channel bandwidth occupied by the small-bandwidth signal, $W_0$ is a bandwidth of a reference data channel, and $\Delta P'$ is a preset power regulation offset; and the control module is located on a base station.

12. The device as claimed in claim 9, wherein, for a reservation signal, the control module is further configured to set transmitted power of the reservation signal to be a sum of a preset power increment and a difference value between the minimum value and a preset power offset.

* * * * *